3,305,852
CUMULATIVE DETECTOR FOR CHLORINE GAS
Jerome C. Cates, Jr., Lake Jackson, Tex., assignor to The Dow Chemical Company, Midland, Mich., a corporation of Delaware
Filed Dec. 9, 1963, Ser. No. 328,943
4 Claims. (Cl. 340—237)

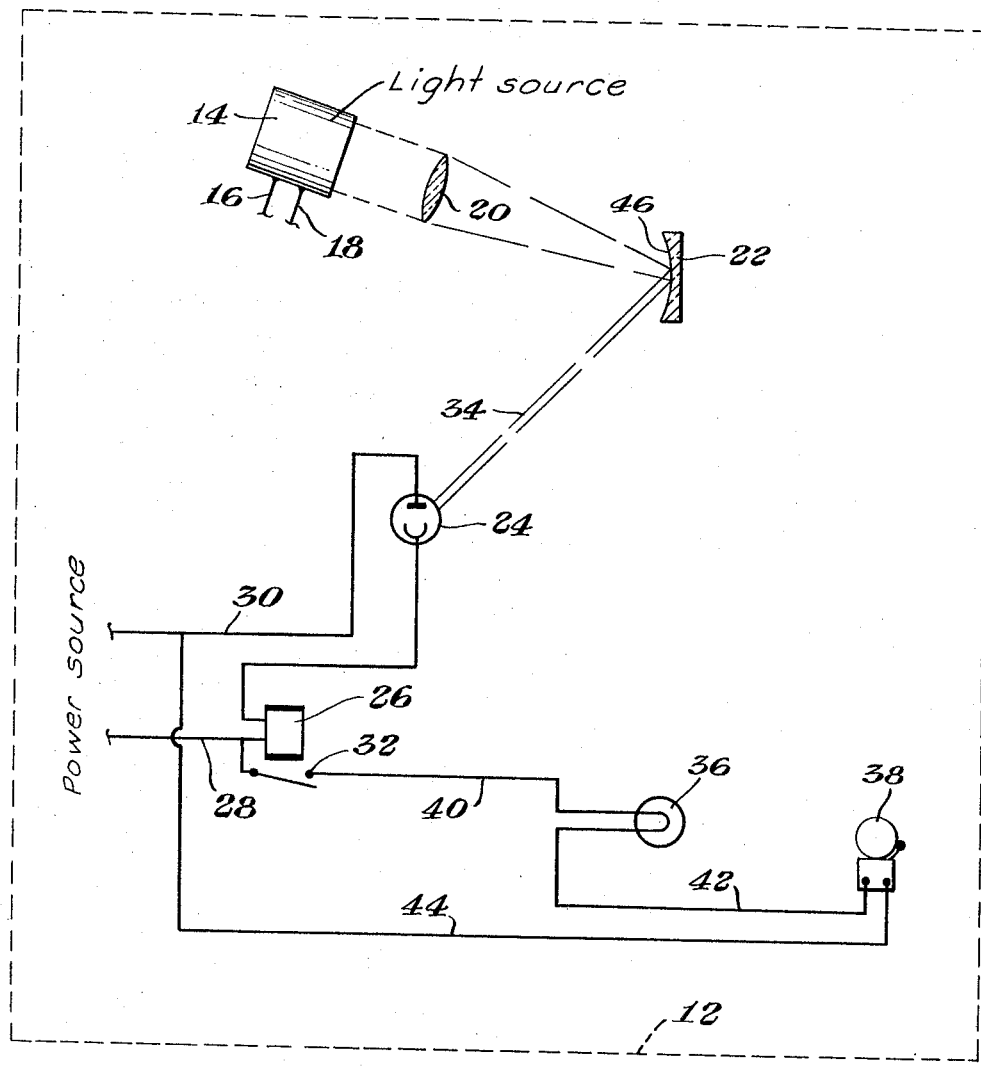

This invention relates to leak detector apparatus and particularly to apparatus for detecting small leaks of gases.

Chlorine leakage into inert-gas-purged boxes or other boxes containing experimental and/or production instruments can be quite damaging to such equipment. Many instruments are easily damaged by exposure to such a corrosive atmosphere.

Because of the small amounts of chlorine which are present in the atmosphere in many chemical plants, especially chlorine production facilities, some means should be provided whereby instruments may be protected.

Accordingly, a principal object of this invention is to provide an improved apparatus for detecting the presence of a corrosive gas.

Another object of this invention is to provide a simple, reliable improved apparatus for detecting the presence of chlorine gas.

In accordance with this invention there is provided a light source, means for focusing light from said light source onto a mirror, a photocell so-disposed that it receives light reflected from said mirror, and signal means coupled to said photocell whereby changes in light imposing on the photocell causes the signal means, usually a light, bell, or horn, to operate. The mirror is made of a polished material, such as silver, for example, which changes its light reflecting characteristics when exposed to chlorine and silver chloride forms on its surface.

The invention as well as other objects and advantages thereof, will best be understood when the following detailed description is read in connection with the accompanying drawing in which the single figure shows, in diagrammatical form, one embodiment of this invention.

Referring to the single figure of the drawing, there is shown apparatus for use in a light impervious container, indicated diagrammatically by the broken lines 12, which comprises a light source 14 having leads 16, 18 which are adapted to be coupled to a power source. A beam converging lens 20 is disposed in axial alignment with the path of a light beam emanating from said source. A mirror 22 having a reflective surface 46 made of polished silver, for example, is disposed in the path of said light beam on the side of the lens 20 which is remote from the light source 14, the reflective surface facing the lens 20. The mirror 22 is tilted with respect to the longitudinal axis of the light beam, thereby reflecting the light beam onto a photocell 24 which is photo-resistive in the instant case. The photocell and the winding of an electromagnetic relay 26 are connected in series, the two leads 28, 30 being connected to a power source, not shown. The single contact 32 of the relay 26 is normally open as light from the beam 34 impinges on the photocell 24. An incandescent light bulb 36 and audible warning device such as a bell 38, for example, are connected in series with the contact 32 and coupled to the leads 28, 30 by means of the leads 40, 42, 44.

In operation, under conditions where no chlorine is present in the instrument container, sufficient light is reflected from the silver surface 46 to increase the resistance of the photocell and limit the current through the winding of the relay 26 to an amount whereby the contact 32 remains open. However, if chlorine is able to enter the container 12 and contact the silver surface 46, silver chloride is formed on the surface 46, the silver chloride turning black as light from the source impinges on it.

The light which is reflected from the surface 46 is thereby reduced as the surface darkens, thereby reducing the resistance of the photocell 24 and permitting sufficient current to flow through the coil of the relay 26 to close the contact 32 and energizing the light 36 and bell 42.

It should be noted that the darkening of the surface 46 of the mirror 22 occurs gradually, acting as a cumulative detector device which operates whenever the total exposure of the device to chlorine reaches a predetermined amount.

It should be noted that the light bulb 36 and bell 38 may be disposed outside of the instrument case, if desired.

If the photocell 24 is a type in which resistance across the cell increases with a decrease in light impinging thereon, the relay 26 would be a type wherein the contact 32 is held in an open position so long as a predetermined current passes through the winding, then is allowed to close as the magnetic field of the relay increases.

While the invention has been described in connection with chlorine as the gas which, with light impingement, causes the surface 46 of the mirror 22 to darken, other gases may cause discoloration of other surfaces. Sulfur in the air, for example, tends to discolor or tarnish the surfaces of several metals, including silver.

Where really precise control of the amount of exposure to chlorine or other gases which discolor the mirror surface is desired, the intensity of the light which impinges on the mirror may be adjusted to just exceed the amount of light required to prevent the closing of the relay contact 32. Therefore, a very slight discoloration of the surface 46 which would diminish the light impinging on the cell 24 would result in the closing of the contact 32.

What is claimed is:
1. In photo-electric apparatus for detecting the presence of chlorine gas, said apparatus comprising a light source, means for directing light from said source onto a fixedly disposed surface of a silver mirror, a photocell so-disposed with respect to said light source and said silver mirror that light from said source is reflected from said surface onto said photocell, a light tight enclosure, said light source, silver mirror and photocell being disposed in said enclosure, and means actuated by said photocell for providing a signal on a predetermined change in light intensity impinging on said cell, the improvement wherein said exposed surface of said silver mirror undergoes a physical change in light reflective properties on exposure to said chlorine gas.

2. Apparatus in accordance with claim 1, wherein said means for providing a signal comprises a relay coupled to said photocell and an audible signal device coupled to said relay.

3. Apparatus in accordance with claim 1, wherein said light tight enclosure is an instrument housing.

4. Apparatus in accordance with claim 2, wherein said relay and said photocell are connected in series with a source of electrical power.

References Cited by the Examiner
UNITED STATES PATENTS

| | | |
|---|---|---|
| 2,153,568 | 4/1939 | Johnson. |
| 2,194,520 | 3/1940 | Darrah _____ 340—237 |
| 2,606,101 | 8/1952 | Sundstrom. |
| 2,787,782 | 4/1957 | Rosenblum et al. _____ 340—237 |

NEIL C. READ, *Primary Examiner.*

D. K. MEYER, *Assistant Examiner.*